United States Patent Office 3,483,252
Patented Dec. 9, 1969

3,483,252
PARTIAL CHLORINATION OF ACETOACETIC
ACID MONOALKYLAMIDES
Ernst Beriger, Allschwil, Switzerland, assignor to Ciba
Limited, Basel, Switzerland, a Swiss company
No Drawing. Filed Jan. 31, 1967, Ser. No. 612,803
Claims priority, application Switzerland, Feb. 21, 1966,
2,508/66
Int. Cl. C07c 97/02, 103/32
U.S. Cl. 260—561                              2 Claims

ABSTRACT OF THE DISCLOSURE

A process for the manufacture of a compound of the formula

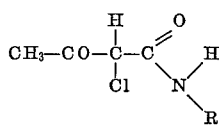

in which R represents a member selected from the group consisting of lower alkyl, lower alkoxyalkyl, lower alkylthioalkyl, lower chloroalkyl and benzyl, which comprises introducing into a compound of the formula

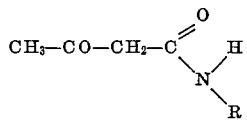

in which R has the meaning defined above, one equivalent of chlorine, at a temperature below 0° C., in the presence of water and urea.

---

The present invention provides a process for the manufacture of compounds of the general formula

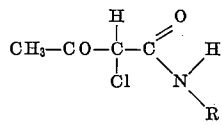

in which R represents an alkyl group which may be substituted by at least one chlorine atom or may be interrupted by at least one oxygen or sulphur atom, or an aralkyl group, which comprises introducing into a compound of the general formula

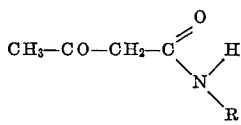

in which R has the above meaning—one equivalent of chlorine, at a temperature below 0° C., advantageously within the range of from —8° to —25° C. in the presence of water and urea.

The reaction is advantageously carried out in the presence of a substance that lowers the freezing point of the reaction mixture, preferably an alcohol, especially ethanol, or another organic solvent, for example acetonitrile.

The present invention provides especially a process for the partial chlorination of compounds having the general formula

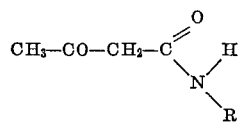

wherein R represents a lower alkyl group, preferably a methyl group, or an alkoxyalkyl group, preferably a methoxypropyl or a methoxyethyl group. The compounds obtained according to this invention are valuable industrial intermediates, for example, in the manufacture of pesticides.

Dutch Patent application 6,500,702, describes the partial chlorination of acetic acid dialkylamides in the presence of water and urea at temperatures of above 0° C. However, when an attempt is made to apply this process to acetic acid monoalkylamides, a chlorinated product which is far from uniform is obtained, for instance, the corresponding partial chlorination of acetic acid methylamide at a temperature within the range of from 5° to 10° C. yields a mixture consisting of:

|   | Percent |
|---|---|
| Monochlorinated product | 58.3 |
| Dichlorinated product | 34.3 |
| Unchlorinated product | 3.9 |

The desired monochlorinated product is very difficult to isolate from this mixture.

As is revealed by the foregoing, the process of this invention, which is carried out at a temperature below 0° C., is an unexpected technical advance.

The following examples illustrate the invention, the parts and percentages being by weight.

EXAMPLE 1

A solution of 1 mol (115 parts) of acetoacetic acid monomethylamide in 190 parts by volume of water is stirred with 34 parts of urea and 60 parts by volume of alcohol and cooled to a temperature of —20° C. 76 parts of chlorine are introduced into the mixture during 50 minutes at a temperature within the range of from —20° C. to —16° C., while stirring the mixture. The potential of the solution is continually checked with a platinum-calomel measuring chain. On termination of the chlorination, the potential rises from 780 to 860 millivolts. While cooling the solution, it is then adjusted to a pH value of 6 by adding 84 parts by volume of concentrated aqueous ammonia and then 40 parts of sodium chloride are added. The mixture is stirred with 200 parts by volume of methylene chloride, the methylenechloride layer is separated, and the extraction of the aqueous phase is repeated with 2×200 parts by volume of methylenechloride. The combined methylenechloride extracts are freed from the solvent under vacuum, to leave, as residue, 130 parts of α-monochloroacetoacetic acid monomethylamide having the following composition:

|   | Percent |
|---|---|
| α-Monochloroacetoacetic acid monomethylamide | 90 |
| α,α-Dichloroacetoacetic acid monomethylamide | 5 |
| Acetoacetic acid monomethylamide | 1.6 |

EXAMPLE 2

(a) 86.5 parts of acetoacetic acid methoxypropylamide are dissolved in 90 parts by volume of water, 17 parts of urea and 60 parts by volume of alcohol are added, and the solution is cooled to a temperature of —20° C. 35 parts of chlorine are introduced at a temperature within the range of from —17 to —22° C., during 45 minutes. The solution is then neutralized with 40 parts by volume of concentrated aqueous ammonia, 30 parts of sodium chloride are then added and the solution is extracted with 3×100 parts by volume of methylenechloride. The combined methylenechloride extracts are freed from the solvent under vacuum, to leave 99 parts of α-monochloroacetoacetic acid methoxypropylamide as residue in the form of a yellow oil.

$C_8H_{14}ClNO_3$—Calculated: Cl, 17.07%. Found: Cl, 16.7%.

(b) An analogous reaction in which 220 parts of alcohol with 34 parts of urea are added to 143 parts of acetoacetic acid isopropylamide in 180 parts of water, and 71 parts of chlorine at −20° C. are introduced yields 175 parts of α-monochloroacetoacetic acid isopropylamide, which can be recrystallized from benzene; it melts at 80° C.

$C_7H_{12}ClNO_2$—Calculated: Cl, 20.0; N, 7.9%. Found: Cl, 20.0; N, 8.2%.

(c) An analogous reaction where 35 parts of chlorine at −20° C. are introduced into 95.5 parts of acetoacetic acid benzylamide in a mixture of 650 parts by volume of acetonitrile and 400 parts by volume of water with 17 parts of urea, yields 110 parts of α-monochloroacetoacetic acid benzylamide, which can be recrystallized from cyclohexane and melts at 64 to 65° C.

$C_{11}H_{10}ClNO_2$—Calculated: Cl, 15.8; N, 6.3%. Found: Cl, 15.4; N, 6.2%.

I claim:
1. A process for the manufacture of a compound of the formula

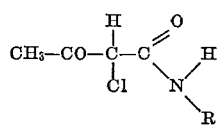

in which R represents a member selected from the group consisting of lower alkyl, lower alkoxy lower alkyl, lower chloroalkyl and benzyl, which comprises introducing into a compound of the formula

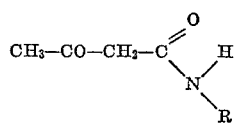

in which R has the meaning defined above, one equivalent of chlorine, at a temperature within the range of about −8° C. to −25° C., in the presence of at least 5 molar equivalents of water and 0.5 molar equivalents of urea.

2. A process as claimed in claim 1, wherein the compound of the formula

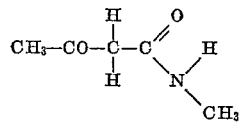

is used as the starting material and the chlorination is performed at a temperature within the range of from −8° C. to −25° C.

References Cited

FOREIGN PATENTS 6500702   7/1965   Netherlands.

ALEX MAZEL, Primary Examiner

J. A. NARCAVAGE, Assistant Examiner